(12) United States Patent
Lee

(10) Patent No.: US 9,992,193 B2
(45) Date of Patent: Jun. 5, 2018

(54) HIGH-SAFETY USER MULTI-AUTHENTICATION SYSTEM AND METHOD

(71) Applicant: Kuang-Yao Lee, Richardson, TX (US)

(72) Inventor: Kuang-Yao Lee, Richardson, TX (US)

( * ) Notice: Subject to any disclaimer, the term of this patent is extended or adjusted under 35 U.S.C. 154(b) by 213 days.

(21) Appl. No.: 15/132,501

(22) Filed: Apr. 19, 2016

(65) Prior Publication Data
US 2017/0302658 A1    Oct. 19, 2017

(51) Int. Cl.
*H04L 29/06* (2006.01)

(52) U.S. Cl.
CPC ........ *H04L 63/0838* (2013.01); *H04L 63/067* (2013.01)

(58) Field of Classification Search
CPC .......................... H04L 63/0838; H04L 63/067
See application file for complete search history.

(56) References Cited

U.S. PATENT DOCUMENTS

| | | | | |
|---|---|---|---|---|
| 6,021,203 A * | 2/2000 | Douceur | ............... | H04L 9/0656 380/252 |
| 8,788,842 B2 * | 7/2014 | Brouwer | ............... | H04L 9/0838 380/44 |
| 8,925,080 B2 * | 12/2014 | Hebert | ................. | H04L 63/1491 726/23 |
| 9,325,499 B1 * | 4/2016 | Juels | ........................ | H04L 9/30 |
| 9,521,127 B1 * | 12/2016 | Childress | ................. | H04L 63/06 |
| 9,565,022 B1 * | 2/2017 | Robshaw | ................. | H04L 9/14 |
| 9,787,715 B2 * | 10/2017 | Touboul | .............. | H04L 63/1491 |
| 2002/0150241 A1 * | 10/2002 | Scheidt | .................... | H04L 9/321 380/44 |
| 2006/0161786 A1 * | 7/2006 | Rao | ..................... | G06F 12/1466 713/183 |
| 2010/0077483 A1 * | 3/2010 | Stolfo | .................... | G06F 21/554 726/24 |
| 2012/0005735 A1 * | 1/2012 | Prasanna | ................. | H04L 9/321 726/7 |
| 2012/0033809 A1 * | 2/2012 | Huang | .................... | H04L 9/001 380/46 |
| 2012/0042364 A1 * | 2/2012 | Hebert | ..................... | G06F 21/46 726/6 |
| 2012/0201381 A1 * | 8/2012 | Miller | ....................... | H04L 9/16 380/255 |
| 2014/0310805 A1 * | 10/2014 | Kandekar | ............... | G06F 21/36 726/19 |
| 2016/0048834 A1 * | 2/2016 | Kurian | ................ | G06Q 20/401 705/44 |
| 2016/0308844 A1 * | 10/2016 | Fielder | .................... | G06F 21/62 |
| 2017/0230179 A1 * | 8/2017 | Mannan | ............... | H04L 9/0897 |
| 2017/0230384 A1 * | 8/2017 | Touboul | ............ | H04L 63/1416 |

* cited by examiner

*Primary Examiner* — Darren B Schwartz
(74) *Attorney, Agent, or Firm* — Bacon & Thomas, PLLC

(57) ABSTRACT

A high-safety user multi-authentication system, comprising: a server having a user habit information and a key generator for generating a real key corresponding to the user habit information and at least one bait key; and a user application unit disposed on a communication device having a user interface, a key receiving unit for receiving the real key and the at least one bait key from the server, an OTP (one time password) generator for generating a real OTP based on the real key and at least one bait OTP based on the at least one bait key; wherein the real OTP is provided to the user interface when the communication device is operated according to the user habit information.

10 Claims, 4 Drawing Sheets

HIGH-SAFETY USER MULTI-AUTHENTICATION SYSTEM AND METHOD

BACKGROUND OF THE INVENTION

1. Field of the Invention

The present invention relates to an authentication system and method and, more particularly, to a high-safety user multi-authentication system and method.

2. Description of Related Art

With the popularity of the application programs (Apps), Internet fraud and data theft are getting more and more serious, and thus most of the network behaviors can be performed only after the user's identity has been authenticated. Currently, the use of One-Time-Password (OTP) is a common authentication method, in which each can be used only one time within a specific time period.

However, current OTP is directly transmitted to the user device, and thus there is a risk that the OTP may be stolen by an illegal user. For example, if the user device is monitored, the illegal user is able to get the content of the OTP.

Although there is provided a method of combining the OTP with user biological information, such as fingerprint, voice print, retina . . . etc., such a method is complicated in implementation, which may result in cost increase. Besides, although the use of hardware-based OTP is safer than that of software-based OTP, a great number of hardware is required at the user end, resulting in inconvenience of usage.

Therefore, there is a need to provide an improved authentication system and method to solve the aforementioned problems.

SUMMARY OF THE INVENTION

An object of the present invention is to provide a high-safety user multi-authentication system, which comprises: a server having a user habit information and a key generator for generating a real key corresponding to the user habit information and at least one bait key; and a user application unit disposed on a communication device having a user interface, a key receiving unit for receiving the real key and the at least one bait key from the server, an OTP (one time password) generator for generating a real OTP based on the real key and at least one bait OTP based on the at least one bait key; wherein the real OTP is provided to the user interface when the communication device is operated according to the user habit information. Thus, the system use the personal habit information of the real user and OTP technique to authenticate the user's identity, not only the security can be improved, but also the cost cannot be increased.

Another object of the present invention is to provide a high-safety user multi-authentication method executed on a user multi-authentication system including a server and a user application unit disposed on a communication device. The method comprises: generating a real key corresponding to a user habit information and at least one bait key by a key generator arranged in the server; receiving the real key and the at least one bait key by a key receiving unit arranged in the communication device; generating a real OTP based on the real key and at least one bait OTP based on the at least one bait key by an OTP generator arranged in the communication device; providing the real OTP on a user interface of the communication device only when the communication device is operated according to the user habit information. Thus, the method use the personal habit information of the real user and OTP technique to authenticate the user's identity, not only the security can be improved, but also the cost cannot be increased.

DETAILED DESCRIPTION OF THE PREFERRED EMBODIMENT

Figure 1:
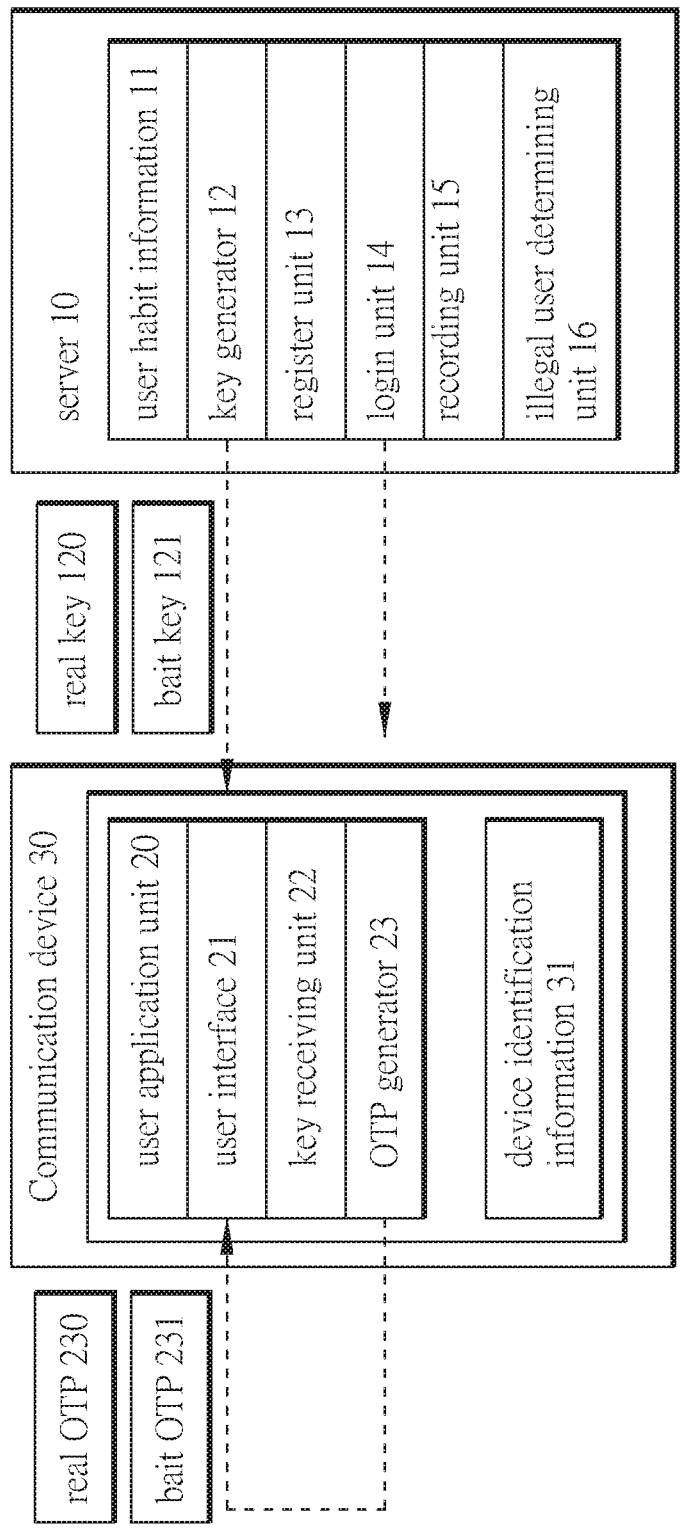
FIG. 1 is a schematic diagram illustrating an embodiment of a high-safety user multi-authentication system according to the invention.

FIG. 1 is a schematic diagram illustrating an embodiment of a high-safety user multi-authentication system 1 according to the invention. The high-safety user multi-authentication system 1 comprises a server 10 and a user application unit 20. The server 10 stores user habit information 11, and has a key generator 12. The user application unit 20 is typically disposed on a communication device 30, and comprises a user interface 21, a key receiving unit 22, and an OTP (one time password) generator 23.

The key generator 12 is used to generate a real key 120 and at least one bait key 121, wherein the real key 120 is corresponding to the user habit information 11. The key receiving unit 22 is used to receive the real key 120 and the at least one bait key 121 from the server 10. The OTP generator 23 is used to generate a real OTP 230 based on the real key 120 and to generate at least one bait OTP 231 based on the at least one bait key 121. The user interface 21 is used to show the real OTP 230 and the at least one bait OTP 231. It is noted that the number of keys generated by the key generator 12 is not limited in the present invention.

The server 10 is generally provided with a register unit 13, e.g. a web page disposed on the server 10. A user can connect to the register unit 13 for registering via the communication device 30 or a normal web browser. When the user connects to the register unit 13 for registering, the register unit 13 records the user habit information 11 of the user. Preferably, the communication device 30 is a mobile device, e.g. a smart phone or a tablet computer.

In one embodiment, when the user operates the communication device 30 for registering, the register unit 13 records a physical action that the user applies to the communication device 30, e.g. leaning the communication device 30 to an angle, placing the communication device 30 to flat position horizontally, shaking the communication device 30, or touching some positions on a screen of the communication device 30, a gesture of the user, etc., and the physical action is recorded as the user habit information 11 by the register unit 13.

In another embodiment, when the user uses the web browser for registering, the user sets the motion for operating the communication device 30 as the user habit information 11. The user can set the user habit information 11 on the register unit 13, or set the user habit information 11 on the communication device 30 and then transmit it to the register unit 13.

The user habit information 11 is preferred, but not limited, to be produced by using a sensor of the communication device 30 to record a physical status of the communication device 30, and then transmitting the record to the register unit 13.

Besides, in one embodiment, the register unit 13 or the server 10 also records a device identification information 31 of the communication device 30. For example, if the communication device 30 is a smart phone or a tablet computer, the device identification information 31 is IEMI code, MAC code, or any code that can be used for identification; if the communication device 30 is a notebook computer, the device identification information 31 is MAC code or specific code of a hardware device. Thus, when a device requests the server 10 to provide the real key 120, the server will identify whether the device is provided with the device identification information 31 and, if yes, the server 10 transmits the real key 120 and the at least one bait key 121 to the communication device 30.

Preferably, each key is set to be corresponding to one physical action, wherein only the real key 120 is corresponding to the user habit information 11, and the bait key 121 is set to be corresponding to a physical action randomly generated by the key generator 12 or can be set by the user, for example, the user can set up four actions respectively associated with a bait key. When the keys are transmitted to the communication device 30, the corresponding data of the physical actions are also transmitted.

When receiving the keys, the OTP generator 23 generates a plurality of OTPs corresponding to each key, wherein there is only one real OTP 230 in the OTPs. Each OTP is presented on the user interface 21 based on its corresponding physical action. It is noted that the user application unit 20 doesn't have the information of the real OTP 230, and the user application unit 20 only presents the OTPs based on their corresponding physical actions.

Figure 2A:
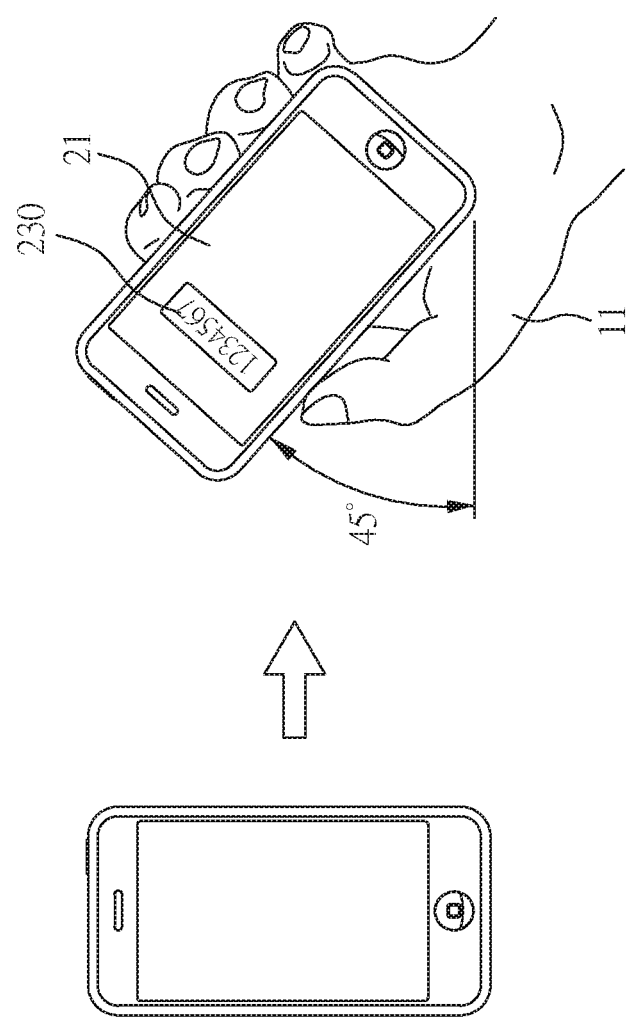
FIG. 2(A) is a schematic diagram illustrating an embodiment of OTPs displayed on a user interface.

FIG. 2(A) is a schematic diagram illustrating an embodiment of the user interface 21 displaying the OTP. As shown in FIG. 2(A), the user interface 21 displays different OTPs in different physical statuses. That is, when the user applies different physical actions to the communication device 30, different OTPs are shown to the user. Only when the user applies the physical action corresponding to the user habit information 11 (e.g. leaning the device 30 to 45 degrees) to the communication device 30, the user can see the real OTP 230 displayed on the user interface 21; otherwise, the user simply sees a bait OTP 231.

Figure 2B:
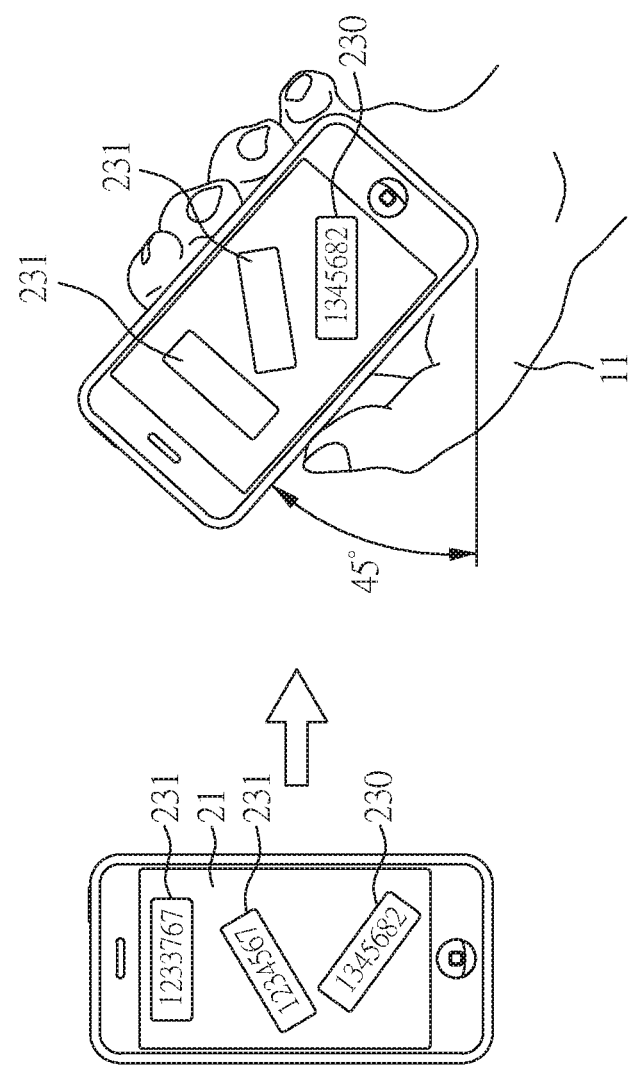
FIG. 2(B) is a schematic diagram illustrating another embodiment of OTPs displayed on a user interface.

FIG. 2(B) is a schematic diagram illustrating another embodiment of the user interface 21 displaying the OTP. As shown in FIG. 2(B), the user interface 21 displays the real OTP 230 and the at least one bait OTP 231 at the same time, and the user can find the real OTP 230 via the user habit information 11. For example, if the user habit information 11 is leaning the communication device 30 at 60 degrees, the real OTP 230 is an OTP displayed and leaned at 60 degrees on the user interface 21.

Please to refer FIG. 1 again, the user can input the OTPs via the user interface 21 for receiving further data provided from the server 10. Preferably, the server 10 further comprises a login unit 14 to receive the real OTP 230 or the at least one bait OTP 231 from the communication device 30.

In one embodiment, when the login unit 14 receives the real OTP 230, the server 10 transmits one real information to the communication device 30, e.g. a real information webpage for providing correct information to the legal user.

In one embodiment, when the login unit 14 receives the at least one bait OTP 231, the server 10 transmits bait information to the communication device 30, e.g. a fake webpage for providing fake information or incomplete information to mislead the illegal user.

In one embodiment, the bait information is provided with a special identity information, the legal user can identify the webpage is a fake webpage via the special identity information, but the illegal user is not aware of the special identity information. For example, in comparison with the real page, the special identity information is a special webpage design, a webpage with different colors in some portions, a webpage with some buttons disposed at different locations, etc. Preferably, the special identity information can be pre-designed by the legal user, so that the legal user can identify the bait information easily.

Besides, in a preferred embodiment, the server 10 further comprises a recording unit 15 and an illegal user determining unit 16. The recording unit 15 is used to record at least one action performed by a current user after the bait information is provided on the user interface. The illegal user determining unit 16 is used to determine whether the current user is an illegal user according to the at least one action performed by the current user.

Preferably, the action is the operation time or the number of operations. Due to that illegal user cannot identify the bait information webpage, the operation of the user on the webpage is continuous. However, as the legal user can identify the bait information webpage easily, the legal user can exit the bait information webpage quickly even entering therein. According to the action performed by the current user, the illegal user determining unit 16 can determine an illegal user and send notice information to the operator of the system 1.

Figure 3:
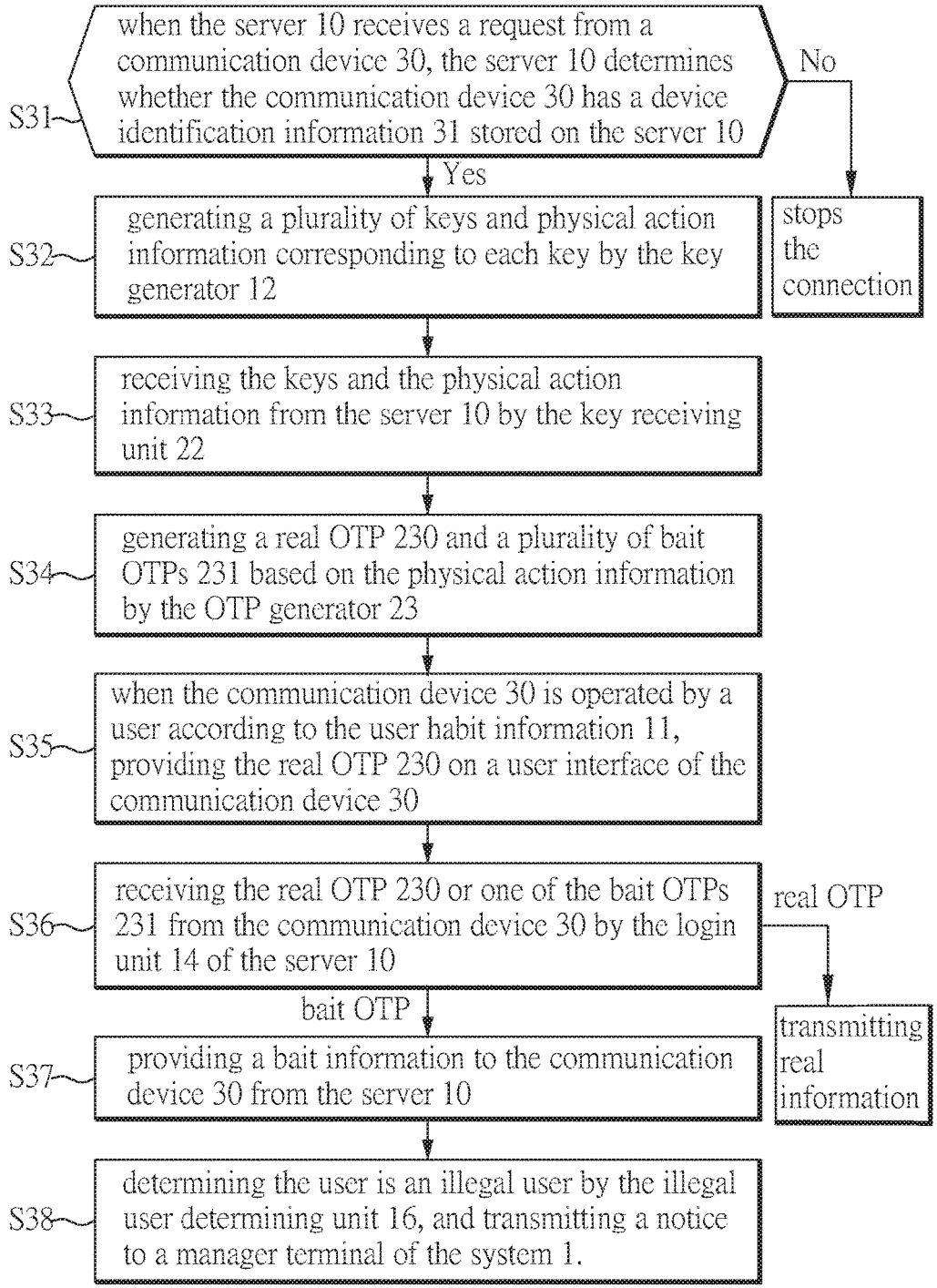
FIG. 3 is a flow chart of a high-safety user multi-authentication method of the invention.

FIG. 3 is a flow chart of a high-safety user multi-authentication method according to the invention. The method is executed by the high-safety user multi-authentication system 1.

First, step S31 is executed in which, when the server 10 receives a request from a communication device 30, the server 10 determines whether the communication device 30 has a device identification information 31 stored in the server 10. If no, the server 10 stops the connection to the communication device 30. If yes, step S32 is executed to generate a plurality of keys and physical action information corresponding to each key by the key generator 12, wherein the keys include a real key 120 corresponding to the user habit information 11 and a plurality of bait keys 121.

Then, step S33 is executed to receive the keys and the physical action information from the server 10 by the key receiving unit 22. Then, step S34 is executed to generate a real OTP 230 and a plurality of bait OTPs 231 based on the physical action information by the OTP generator 23. Then, step S35 is executed, in which, when the communication device 30 is operated by a user according to the user habit information 11, the real OTP 230 is provided on a user interface of the communication device 30.

Then, step S36 is executed to receive the real OTP 230 or one of the bait OTPs 231 from the communication device 30 by the login unit 14 of the server 10. If the real OTP 230 is received, real information is provided to the communication device 30 from the server 10, e.g. providing a real webpage. If one of the bait OTPs 231 is received, step S37 is executed to provide bait information to the communication device 30 from the server 10, e.g. proving a fake webpage, and an operation action performed by the user on the bait information is recoded.

If the user continuously executes operation on the bait information, step S38 is executed to determine the user being an illegal user by the illegal user determining unit 16, and transmit a notice to an operation end of the system 1.

Accordingly, the invention provides a multi-authentication scheme in which, only when using the communication device 30 registered in the server 10 and applying the user habit information 11 to the communication device 30, the user can get the real OTP 230. Besides, the illegal user can receive the bait information only, and thus the system 1 can find the illegal user immediately, so as to improve the safety of the system 1.

Although the present invention has been explained in relation to its preferred embodiments, it is to be understood that many other possible modifications and variations can be made without departing from the spirit and scope of the invention as hereinafter claimed.

What is claimed is:

1. A high-safety user multi-authentication system, comprising:
    a server having a user habit information and a key generator for generating a real key corresponding to the user habit information and at least one bait key;
    a user application unit disposed on a communication device having a user interface, a key receiving unit for receiving the real key and the at least one bait key from the server, an OTP (one time password) generator for generating a real OTP based on the real key and at least one bait OTP based on the at least one bait key;
    a device identification information corresponding to the communication device so that, only after using the device identification information to identify the communication device, the server transmits the real key and the at least one bait key to the communication device; and
    an illegal user determining unit used to determine whether a current user is an illegal user according to at least one operation action from the current user;
    wherein the real OTP is provided to the user interface when the communication device is operated according to the user habit information.

2. The high-safety user multi-authentication system of claim 1, further comprising a login unit for receiving the real OTP or the at least one bait OTP from the communication device.

3. The high-safety user multi-authentication system of claim 2, wherein, when the login unit receives the at least one bait OTP, a bait information is transmitted to the communication device.

4. The high-safety user multi-authentication system of claim 3, further comprising a recording unit for recording the at least one operation action from a current user after the bait information is provided on the user interface.

5. The high-safety user multi-authentication system of claim 1, wherein, the user habit information is at least one action applied to the communication device by a user.

6. A high-safety user multi-authentication method executed on a user multi-authentication system including a server and a user application unit disposed on a communication device, the method comprising:
    generating a real key corresponding to a user habit information and at least one bait key by a key generator arranged in the server;
    receiving the real key and the at least one bait key by a key receiving unit arranged in the communication device;
    generating a real OTP based on the real key and at least one bait otp based on the at least one bait key by an OTP generator arranged in the communication device;
    providing the real OTP on a user interface of the communication device only when the communication device is operated according to the user habit information;
    using a device identification information on the server to identify the communication device;
    transmitting the real key and the at least one bait key to the communication device only after identifying the communication device; and
    determining whether the current user is an illegal user by an illegal user determining unit according to at least one operation action from the current user.

7. The high-safety user multi-authentication method of claim 6, further comprising:
    receiving the real OTP and the at least one bait OTP by a login unit.

8. The high-safety user multi-authentication method of claim 7, further comprising:
    bait OTP transmitting a bait information to the communication device when the login unit receives the at least one bait OTP.

9. The high-safety user multi-authentication method of claim 8, further comprising:
    bait information recording the at least one operation action from a current user by a recording unit after the bait information is provided on the user interface.

10. The high-safety user multi-authentication method of claim 6, wherein the user habit information is at least one action applied to the communication device by a user.

* * * * *